(12) United States Patent
Hovstø et al.

(10) Patent No.: US 7,669,709 B2
(45) Date of Patent: Mar. 2, 2010

(54) GUIDANCE UNIT FOR CONVEYOR BELT

(76) Inventors: Kenneth Hovstø, Eikelia 11, Porsgrunn (NO) N-3940; Kjell Arne Gaarden, Østliveien 3, Herøya (NO) N-3927

( * ) Notice: Subject to any disclaimer, the term of this patent is extended or adjusted under 35 U.S.C. 154(b) by 0 days.

(21) Appl. No.: 12/302,803

(22) PCT Filed: May 30, 2007

(86) PCT No.: PCT/NO2007/000184

§ 371 (c)(1),
(2), (4) Date: Mar. 10, 2009

(87) PCT Pub. No.: WO2007/139390

PCT Pub. Date: Dec. 6, 2007

(65) Prior Publication Data

US 2009/0178901 A1    Jul. 16, 2009

(30) Foreign Application Priority Data

Jun. 1, 2006   (NO) .................................. 20062534

(51) Int. Cl.
*B65G 39/16* (2006.01)
(52) U.S. Cl. ...................................... 198/806; 198/840
(58) Field of Classification Search ................. 198/806, 198/807, 810.03, 840
See application file for complete search history.

(56) References Cited

U.S. PATENT DOCUMENTS 2,160,057  A      5/1939   Carus
3,056,646  A  *  10/1962   Andersen et al. ................ 431/2
3,593,841  A  *   7/1971   Leow .......................... 198/806
4,506,782  A  *   3/1985   Jeanneret et al. ............. 198/806
5,609,241  A  *   3/1997   Shaw .......................... 198/806
5,743,378  A  *   4/1998   Hovstø et al. ................ 198/806
6,116,410  A  *   9/2000   Malmberg ..................... 198/806
6,186,317  B1 *   2/2001   Hovsto et al. ................ 198/806
6,431,348  B2 *   8/2002   Malmberg ..................... 198/806
6,776,280  B2 *   8/2004   Hovstø et al. ................ 198/806

FOREIGN PATENT DOCUMENTS

| DE | 174491   | 10/1905 |
| EP | 1355840  | 7/2002  |
| WO | 95/14627 | 6/1995  |
| WO | 97/45344 | 12/1997 |
| WO | 97/45345 | 12/1997 |

* cited by examiner

*Primary Examiner*—Douglas A Hess
(74) *Attorney, Agent, or Firm*—Christian Abel

(57) ABSTRACT

A conveyor belt aligning device (1) comprising a support frame (2) mounted on a support beam (3) and being substantially horizontal pivotable about a first axis (4), the support frame (2) comprising a frame formed by a cross member 96) and a lever arm (8) extending from the cross member (6); at least one conveyor belt support roller (10) mounted on the cross member (6); a guide roller (14, 15) mounted on a transverse beam that is pivotably mounted on the lever arm (8); the transverse beam (16) being pivotable about a second axis (18); a stay member (20) extending between the support beam (3) and the transverse beam (16). The conveyor belt aligning device further comprising adjusting means for adjusting the distance (19) between the first axis (14) and the second axis (18) and adjusting means for adjusting the distance between the second axis (18) and a central axis (26) of rotation of the guide roller (14, 15).

23 Claims, 3 Drawing Sheets

GUIDANCE UNIT FOR CONVEYOR BELT

The present invention relates to a belt guidance unit for centering a conveyor belt, which during operation is susceptible to lateral displacement away from a neutral position in its longitudinal direction and is concerned particularly with an adjustable belt guidance unit. According to the invention the belt guidance unit can be employed on conveyor belts that move in one direction as well as in two opposite directions with only very slight alterations and the basic constructional features of the belt guidance unit are substantially the same in the two operational situations.

The belt guidance unit according to the present invention is used for guiding conveyor belts particularly in the field of processing plants for various types of materials in bulk format, such as granulated ores, etc.

BACKGROUND OF THE INVENTION

In connection with plants where such conveyor belts are employed, it is known that for various reasons the belts "wander" laterally on rollers and along their tracks. This is due in part to uneven loading, partly to misalignment of supports and rollers and often a combination of several different factors that produce a random pattern of movement for lateral movement of the belt. This lateral movement may be defined as a deviation from a basic neutral position where the belt travels in its longitudinal direction along an imaginary centre line or other kind of desired path over rollers or guides. Lateral movement in the belt will move the belt to the side of this neutral position or path for the belt, whereupon it should be restored to this neutral position. This creates the need for a guiding device that senses when the belt is out of the neutral position, whereupon it corrects the travel of the belt in its longitudinal direction, thus returning the belt to the neutral position. This may also be a dynamic correction device that constantly corrects the belt relative to positions on both sides of the neutral position as well as preferably in relation to both directions of travel in the belt's longitudinal direction.

A belt guidance unit for the above-mentioned tasks and areas of application ideally should furthermore be simple and robust to operate while it must be easy to install and adjust before use. The construction should furthermore be capable of being adapted to the existing conditions and loads either by employing different dimensions for the constructional parts or by being able to adjust the design of the constructional parts that are already installed in an existing system, such as, e.g., rollers, guides, mounting brackets, etc.

A belt guidance unit, moreover, may be able to be adapted for a conveyor belt that moves in one or two directions without major constructional alterations.

From previously known solutions within the field, a device may be mentioned for conveyor belts that travel over rollers or supports, described in DE 174 491, which device corrects for lateral displacements that occur in the belt during operation, causing the belt to be returned to its neutral position. A set of guide rollers for the conveyor belt is mounted on a plate, which is rotatably attached to the base. To the rotatable plate is mounted an arm with a tie bar. The arm may be articulated and rotatable about a pivot that is attached to the base. To the tie bar are attached guide rollers, which move along the edge of the conveyor belt and which, in the event of lateral displacement of the belt, transfer the movement to the tie bar. The movement is transferred to the lever arm, which in turn transfers the movement to the plate, thus causing the guide rollers' axes to be tilted and returning the conveyor belt to its neutral position.

The above-mentioned solutions, however, is relatively complicated in the mechanisms for producing movement and the solutions are therefore expensive and complicated with regard to mounting and adjustment, while also requiring some inspection. Due to the complicated solutions they are relatively specific for a particular size and type of conveyor belt. It may be difficult or not possible to alter the mechanisms for various sizes of conveyor belts.

It is therefore an object of the present invention to provide a guide device or a belt guidance unit that may be alter or adjusted for different types and ranges of conveyor belts.

DISCLOSURE OF THE INVENTION

According to a first aspect of the present invention there is provided a conveyor belt aligning device comprising a support frame mounted on a support beam and being substantially horizontal pivotable about a first axis, the support frame comprising and a frame formed by a cross member and a lever arm extending from the cross member;

at least one conveyor belt support roller mounted on the cross member of the support frame;

a guide roller mounted on a transverse beam that is pivotably mounted on the lever arm of the support frame, the transverse beam being pivotable about a second axis, the guide roller being adapted to engage one of the longitudinal edges of the conveyor belt;

a stay member extending between the support beam of the support frame and the transverse beam so that, in use, the transverse beam remains substantially perpendicular with the centre line of the conveyor belt, characterised in that, the conveyor belt aligning device comprises means for adjusting the distance between the first axis of the support frame and the second axis of the transverse beam, and means for adjusting the distance between the second axis of the transverse beam and a central axis of rotation of the guide roller.

Preferably, the means for adjusting the distance of the between the first axis and the second axis of the guide roller is provided by the lever arm being adjustable along the longitudinal length and by the length of the stay member extending between the support beam of the support frame and the transverse beam being adjustable.

The lever arm preferably comprises an adjustable telescopic element.

Preferably, at least one point of attachment between the stay member and the support beam of the support frame and/or the point of attachment between the stay member and the transverse beam is adjustable along the length of the stay member.

Preferably, the means for adjusting the distance between the second axis of the transverse beam and the central axis of the guide roller is provided by the transverse beam being adjustable along the longitudinal length.

The transverse beam preferably comprises at least one adjustable telescopic element.

In an embodiment of the present invention the conveyor belt aligning device preferably comprises two guide rollers each mounted on a respective distal ends of the transverse beam.

In a preferred embodiment the ratio between the distance between the second axis and the central axis of the guide roller and the distance of the between the first axis and the second axis is substantially 3:1. This ratio has been shown to be particularly favourable, providing a suitable relationship between a deflection as a result of the belt moving out of the neutral position and the corrective movement of the roller. The ratio may further be of the order of 2:1 to 5:1.

The conveyor belt aligning device for centering a conveyor belt according to the present invention guides a conveyor belt, which during operation is susceptible to lateral displacement relative to a longitudinal neutral position. The belt extends over a guide roller mounted substantially across the belt's direction of travel.

BRIEF DESCRIPTION OF THE DRAWINGS

A specific embodiment of the invention will now be described by way of example only with reference to the accompanying drawing, in which.

Figure 1:
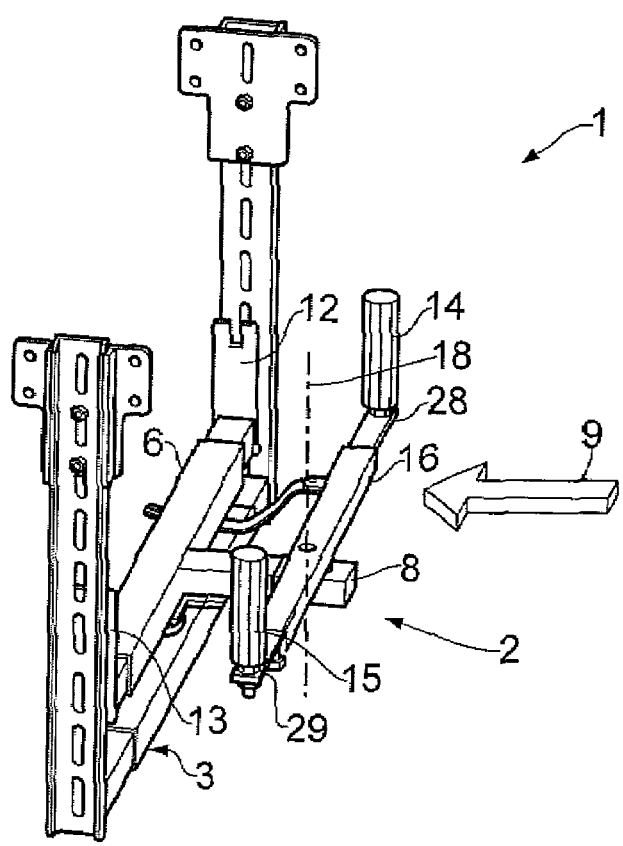
FIG. 1 is an isometric view of a conveyor belt aligning device according to the present invention, and shows the guide roller removed.
Figure 2:
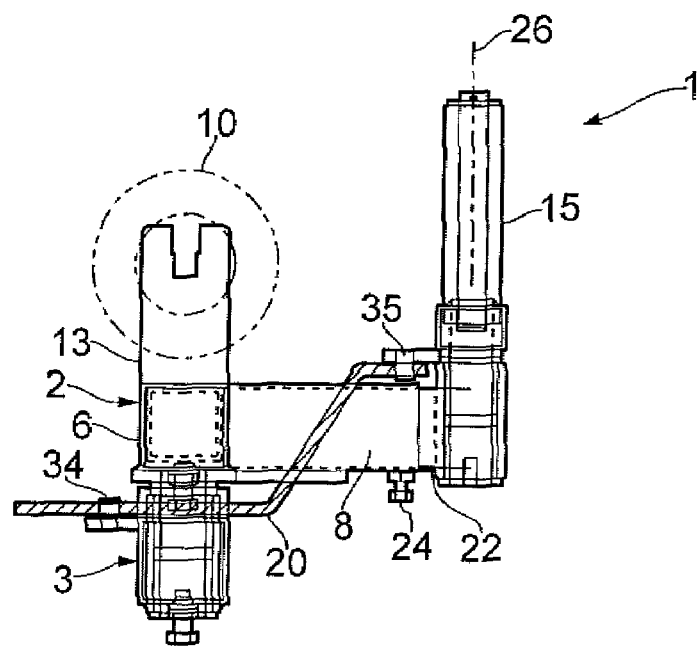
FIG. 2 is a side view of the conveyor belt aligning device shown in FIG. 1 and shows the guide roller in a dotted outline.
Figure 3:
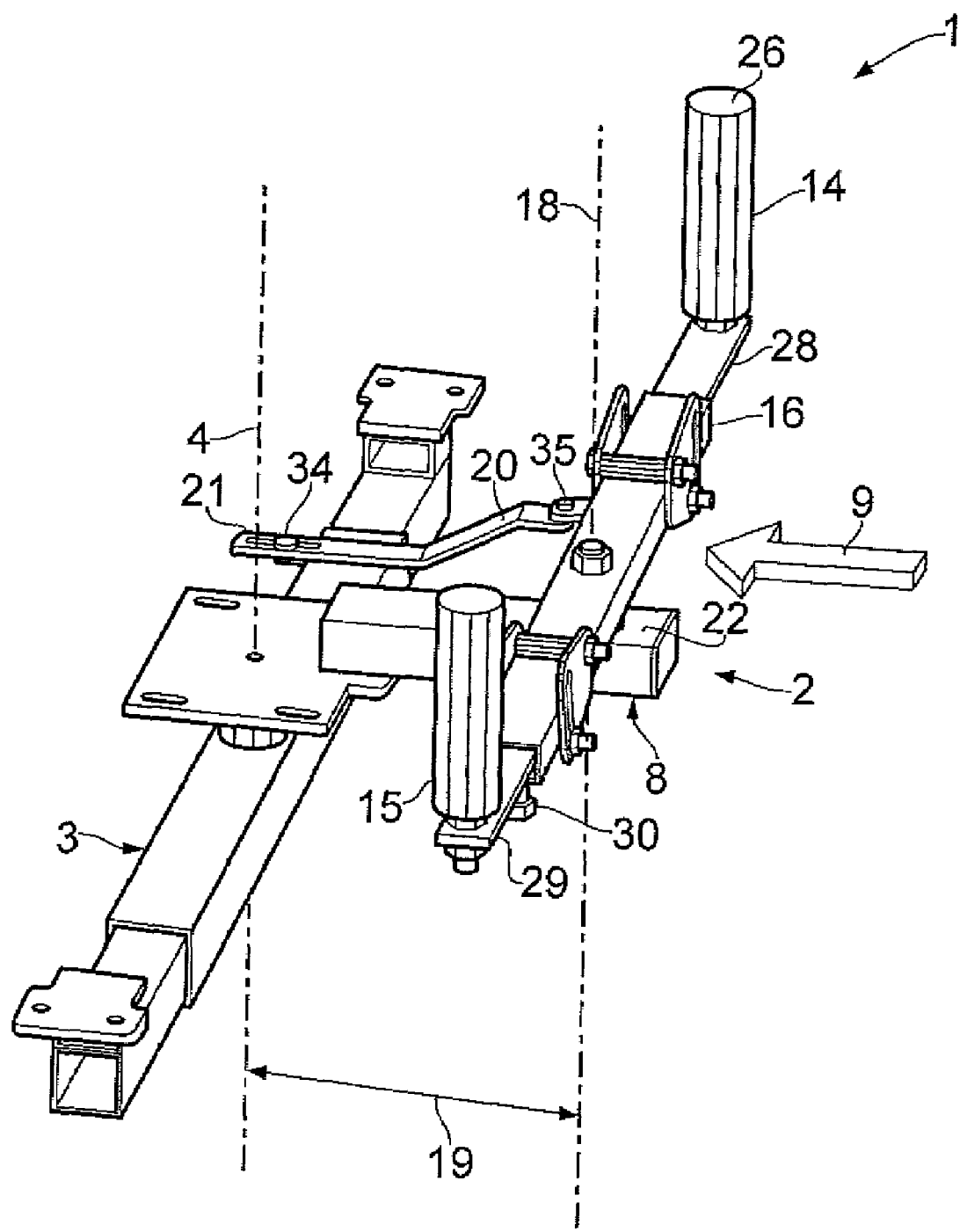
FIG. 3 is an isometric view of the conveyor belt aligning device shown in FIG. 1, and shows the guide roller and the central beam removed.
Figure 4:
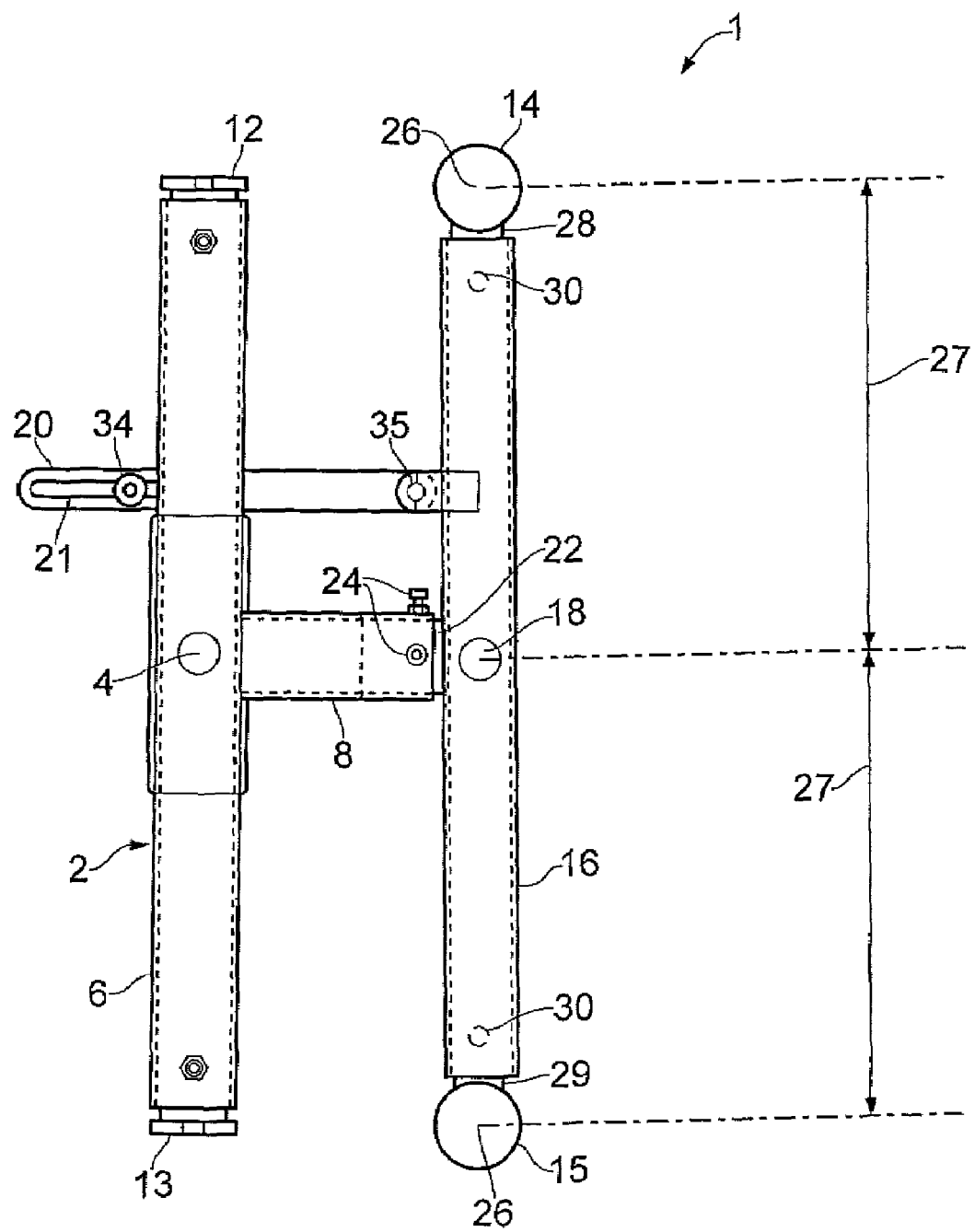
FIG. 4 is a plan view of the conveyor belt aligning device shown in FIG. 1, and shows the guide roller removed.

With reference to the Figures, there is show a conveyor belt aligning device 1 comprising a support frame 2 mounted on a support beam 3 and being substantially horizontal pivotable about a first axis 4. The support frame 3 comprises a frame formed by a cross member 6 and a lever arm 8 extending from the cross member 6. The device 1 has a conveyor belt support roller 10 (see FIG. 2) mounted on the cross member 6 of the support frame 2 via two end brackets 12, 13. A pair of guide rollers 14, 15 is mounted at each end of a transverse beam 16. The transverse beam 16 is pivotably mounted on the lever arm 8 of the support frame 2, the transverse beam 16 being pivotable about a second axis 18. The guide rollers 14, 15 are each adapted to engage a respective longitudinal edge of the conveyor belt (not shown). The direction of the belts movement is indicated by the arrow 9. A parallel stay member 20 extends between the support beam 3 of the support frame 2 and the transverse beam 16 such that, in use, the transverse beam 16 remains substantially perpendicular with the centre line of the conveyor belt.

The device 1 also comprises means for adjusting the perpendicular distance 19 between the first axis of the support frame and the second axis of the transverse beam in the form of a telescopic element 22 that forms part of the lever arm 8. The element 22 is slidable into the end of the lever 8 and is locked in place by bolts 24. The device 1 also comprises means for adjusting the respective distances 27 between the second axis 18 of the transverse beam 16 and the respective central axis 26 of the guide rollers 14, 15 in the form of two respective telescopic elements 28, 29. The elements 28, 29 are each slidable into the respective ends of the transverse beam 16 and locked in place by bolts 30.

It should be noted that the ratio between the distance 27 and the distance 19 may be changed to provide an optimum performance of the conveyor belt aligning device for different types and sizes of conveyor belts. In a preferred embodiment the ratio between the distance 19 between the second axis 18 and the central axis 26 of the guide roller and the distance 19 of the between the first axis 4 and the second axis 18 is substantially 3:1. This ratio has been shown to be particularly favourable, providing a suitable relationship between a deflection as a result of the belt moving out of the neutral position and the corrective movement of the roller. The ratio may further be of the order of 2:1 to 5:1. The greater the length of distance 19 the slower the response of the device 1 i.e. the more time it will take to correct the belt alignment and the shorter the length of distance 19 the quicker the response of the device 1 i.e. the less time it will take to correct the belt alignment.

The belt training idler can be provided with one or more supporting rollers 1. The supporting rollers 1 are mounted on to a plate 2 which is rotatably attached to the base by means of a pivot or a pivot joint 4. The base can be a foundation or a beam 11 mounted between the frame side members 10 of the conveyor belt 5. From the middle of the plate 2 and perpendicular thereto there is attached a lever arm 6 which can be jointed. A transverse stay 7 is rotatably mounted to the lever arm by means of a pivot joint 8. Guide rollers 9 are mounted at each end of the transverse stay 7.

In Figures the conveyor belt moves in the direction 9 from the guide rollers 14, 15 towards the supporting roller 10. In this case direct transfer is used between the guide rollers 14, 15 and the supporting roller 10.

The length of the parallel stay 20 is adjusted so that the transverse beam 16 is mounted perpendicular with the centre line of the conveyor belt. The parallel stay 20 is rotatably mounted by means of two pivot joints 34, 35 at respective ends. The stay 20 is formed with a slot 21 through which extends the pivot joint 34. The pivot joint 34 may be clamped onto the stay 20 at any point along the slot 21. It shall be appreciated that the clamping point on stay 20 will be adjusted to correspond to the extension of the lever arm 8. The parallel stay 20 can also be mounted between the transverse stay 16 and a base of the conveyor belt.

In use, if the conveyor belt moves on the supporting roller 10 towards either one of the guide rollers 14, 15 in order to correct for lateral misalignment of the conveyor belt the supporting roller 10 must be rotated in the opposite direction. This is achieved when the conveyor belt touches one of the rollers 14, 15 and the transverse beam 16 and the support frame 3 pivots about the first axis 4 and the second axis 18.

One advantage of the invention is that the parallel stay 20 ensures that the transverse stay 16 with the guide rollers 14, 15 is kept approximately in a perpendicular position on the centre line of the conveyor belt regardless of lateral misalignment of the conveyor belt and regardless of uneven weight loading on the conveyor belt.

Another advantage of the invention is that the device 1 is adjustable to fit various types of conveyor belts each having different belt widths.

A further advantage of the invention is that the response of the device 1 is adjustable, such that the time taken for the belt alignment to be corrected may be increased or decreased as desired.

It shall be appreciated that the present invention may be adapted to be employed on conveyor belts that move in one direction or in an opposite direction as well as in two opposite directions with only very slight alterations and the basic constructional features of the belt guidance unit are substantially identical in the two operational situations.

The invention claimed is:

1. A conveyor belt aligning device comprising a support frame mounted on a support beam and being substantially horizontal pivotable about a first axis, the support frame comprising a frame formed by a cross member and a lever arm extending from the cross member; at least one conveyor belt support roller mounted on the cross member of the support frame; a guide roller mounted on a transverse beam that is pivotably mounted on the lever arm of the support frame, the transverse beam being pivotable about a second axis, the guide roller being adapted to engage one of the longitudinal edges of a conveyor belt; wherein the distance between the second axis of the transverse beam and a central axis of rotation of the guide roller is adjustable; and further comprising a stay member extending between the support beam of the support frame and the transverse beam so that, in use, the transverse beam remains substantially perpendicular with the center line of the conveyor belt, wherein the distance between the first axis of the support frame and the second axis of the transverse beam is adjustable by virtue of the lever arm being adjustable along the longitudinal length and by the length of the stay member extending between the support beam of the support frame and the transverse beam being adjustable.

2. A conveyor belt aligning device as claimed in claim 1, wherein the lever arm comprises an adjustable telescopic element.

3. A conveyor belt aligning device as claimed in claim 2, wherein at least one point of attachment between the stay member and the support beam of the support frame and/or the point of attachment between the stay member and the transverse beam is adjustable along the length of the stay member.

4. A conveyor belt aligning device according to claim 3, wherein the distance between the second axis of the transverse beam and the central axis of the guide roller is adjustable by virtue of the transverse beam being adjustable along the longitudinal length.

5. A conveyor belt aligning device according to claim 4 wherein the transverse beam comprises at least one adjustable telescopic element.

6. A conveyor belt aligning device according to claim 5, wherein the conveyor belt aligning device comprises two guide rollers, each mounted on a respective distal ends of the transverse beam.

7. A conveyor belt aligning device according to claim 6, wherein the ratio between the distance between the second axis and the central axis of the guide roller and the distance between the first axis and the second axis is substantially 3:1.

8. A conveyor belt aligning device according to claim 7, wherein the lever arm extends from the cross member in a direction which is opposite of the conveyor belt travel direction.

9. A conveyor belt aligning device according to claim 6, wherein the ratio between the distance between the second axis and the central axis of the guide roller and the distance between the first axis and the second axis is substantially 2:1.

10. A conveyor belt aligning device according to claim 6, wherein the ratio between the distance between the second axis and the central axis of the guide roller and the distance of the between the first axis and the second axis is substantially 5:1.

11. A conveyor belt aligning device according to claim 2, wherein the adjustable telescopic element extends from the cross member in a direction which is opposite of the conveyor belt travel direction.

12. A conveyor belt aligning device according to claim 2, wherein the ratio between the distance between the second axis and the central axis of the guide roller and the distance between the first axis and the second axis is substantially 3:1.

13. A conveyor belt aligning device according to claim 2, wherein the ratio between the distance between the second axis and the central axis of the guide roller and the distance between the first axis and the second axis is substantially 2:1.

14. A conveyor belt aligning device according to claim 2, wherein the ratio between the distance between the second axis and the central axis of the guide roller and the distance of the between the first axis and the second axis is substantially 5:1.

15. A conveyor belt aligning device according to claim 1, wherein the lever arm extends from the cross member in a direction which is opposite of the conveyor belt travel direction.

16. A conveyor belt aligning device according to claim 1, wherein the ratio between the distance between the second axis and the central axis of the guide roller and the distance between the first axis and the second axis is substantially 3:1.

17. A conveyor belt aligning device according to claim 1, wherein the ratio between the distance between the second axis and the central axis of the guide roller and the distance between the first axis and the second axis is substantially 2:1.

18. A conveyor belt aligning device according to claim 1, wherein the ratio between the distance between the second axis and the central axis of the guide roller and the distance of the between the first axis and the second axis is substantially 5:1.

19. A conveyor belt aligning device as claimed in claim 1, wherein at least one point of attachment between the stay member and the support beam of the support frame and/or the point of attachment between the stay member and the transverse beam is adjustable along the length of the stay member.

20. A conveyor belt aligning device according to claim 19, wherein the ratio between the distance between the second axis and the central axis of the guide roller and the distance between the first axis and the second axis is substantially 3:1.

21. A conveyor belt aligning device according to claim 19, wherein the ratio between the distance between the second axis and the central axis of the guide roller and the distance between the first axis and the second axis is substantially 2:1.

22. A conveyor belt aligning device according to claim 19, wherein the ratio between the distance between the second axis and the central axis of the guide roller and the distance of the between the first axis and the second axis is substantially 5:1.

23. A conveyor belt aligning device according to claim 19, wherein the lever arm extends from the cross member in a direction which is opposite of the conveyor belt travel direction.

\* \* \* \* \*